United States Patent [19]

Koopman et al.

[11] Patent Number: 5,157,529
[45] Date of Patent: Oct. 20, 1992

[54] DISPLAY DEVICE HAVING WAVELENGTH-DEPENDENT BIREFRINGENCE COMPENSATION

[75] Inventors: Henricus G. Koopman; Hendrik A. Van Sprang, both of Eindhoven, Netherlands

[73] Assignee: U.S. Philips Corporation, New York, N.Y.

[21] Appl. No.: 688,778

[22] Filed: Apr. 18, 1991

[30] Foreign Application Priority Data

May 16, 1990 [NL] Netherlands ............ 9001142

[51] Int. Cl.⁵ .......................................... G02F 1/1335
[52] U.S. Cl. ................................................ 359/73
[58] Field of Search ............. 350/347 R, 347 E; 359/73

[56] References Cited

U.S. PATENT DOCUMENTS

| | | | |
|---|---|---|---|
| 4,080,046 | 3/1978 | Nishizaki | 350/347 R |
| 4,239,349 | 12/1980 | Scheffer | 350/347 R |
| 4,385,806 | 5/1983 | Fergason | 350/347 R |
| 4,957,349 | 9/1990 | Clerc et al. | 350/347 R |
| 4,973,137 | 11/1990 | Kozaki | 350/347 R |

FOREIGN PATENT DOCUMENTS

| | | | |
|---|---|---|---|
| 0371797 | 6/1990 | European Pat. Off. | 359/73 |
| 0379315 | 7/1990 | European Pat. Off. | 350/347 R |
| 1462978 | 1/1977 | United Kingdom | 350/347 R |

Primary Examiner—Janice A. Howell
Assistant Examiner—Anita Pellman Gross
Attorney, Agent, or Firm—John C. Fox

[57] ABSTRACT

By a suitable choice of a retardation foil with a specific value of $\Delta n\ (\lambda)$ it is possible to make the transmission/-voltage characteristic curves for, for example, red, green and blue light extend parallel in an ECB display. The same type of display can then be used for modulating three colors, with modulation voltages shifted for each color.

33 Claims, 3 Drawing Sheets

DISPLAY DEVICE HAVING WAVELENGTH-DEPENDENT BIREFRINGENCE COMPENSATION

BACKGROUND OF THE INVENTION

The invention relates to a display device provided with a layer of liquid crystalline material having a positive dielectric anisotropy, between a first transparent supporting plate provided with at least a first transparent drive electrode and a second supporting plate provided with at least a second drive electrode, the layer of liquid crystalline material being switchable via electric voltages on the drive electrodes between a first state, in which the molecules of the liquid crystalline material have a first direction of orientation substantially parallel to the supporting plates or extend at a small angle to a plane parallel to the supporting plates, and a second state, in which the molecules of the liquid crystalline material have a second direction of orientation substantially perpendicular to the plane of the supporting plates, the device being further provided with an extra layer of birefringent material compensating a given quantity of birefringence in the layer of liquid crystalline material.

The invention also relates to a projection display device.

A display device of the type mentioned above is described, for example in U.S. Pat. No. 4,999,619. In this application such a display device is shown for use in projection television in which the display device is driven in the reflective mode, while the parameters are optimised for one wavelength ($\lambda o$).

When using materials having a positive dielectric anisotropy ($\Delta\epsilon > 0$), a device as shown in this application requires a very high voltage for full extinction, a condition in which all liquid crystal molecules (directors) are perpendicular to the supporting plates. As has been described in said patent, such a high voltage can be obviated by choosing an off-voltage at which a given quantity of light corresponding to a phase shift $\delta$ of the polarised light is still reflected. Full extinction is then obtained by extending the device by means of a phase plate of, for example, polaroid, cellophane or another suitable birefringent material producing an opposite phase shift. This is the so-called planar ECB effect (ECB: Electrically Controlled Birefringence).

However, this solution holds for one wavelength or a very narrow wavelength range having a sharp peak. Since the transmission/voltage characteristic curves do not run parallel for all wavelengths, the full extinction is limited to one narrow wavelength range at one selected phase shift. Moreover it appears that the birefringence depends to a very great extent on the wavelength when using this ECB effect. This renders the use of a single display cell in projection display, in which beams of 3 different colours (red, green, blue) are reflected by 3 cells having substantially identical properties (thickness, birefringence), substantially impossible.

OBJECTS AND SUMMARY OF THE INVENTION

It is one of the objects of the invention to obviate the above-mentioned problems to a substantial extent.

It is another object of the invention to provide a device for projection display in which only one type of display cell for three colour beams is sufficient.

It is a further object of the invention to provide a device for projection display using one display cell (provided with, for example, colour filters) in which the complete image is formed by means of one light beam which is not split up.

To this end a display device according to the invention is characterized in that the phase shift of incident polarised light due to birefringence in the extra layer of birefringent material decreases as a function of the increasing wavelength.

Notably when the above-mentioned planar ECB effect is used, it appears that the variation in birefringence can be compensated substantially throughout the wavelength by a similar variation in the extra layer. Preferably it holds in this case that the values $\delta r$, $\delta g$, $\delta b$ of the phase shift due to the birefringence of the extra layer at wavelengths of approximately 658 nm ($\delta r$), 546 nm ($\delta g$) and 480 nm ($\delta b$) at least satisfy the conditions $\delta g/\delta r > 658/546$ and $\delta b/\delta g > 546/480$.

In practice this means that it holds for this specific example that $20° < \delta r < 40°$, $25° < \delta g < 45°$ and $30° < \delta b < 50°$, respectively.

In this manner substantially parallel transmission/voltage characteristic curves are obtained for a part of the voltage range for red light ($\lambda$ = approximately 658 nm), green light ($\lambda$ = approximately 546 nm) and blue light ($\lambda$ = approximately 480 nm).

By providing a voltage compensation circuit for at least two colours in a colour display device, the three transmission/voltage characteristic curves of the total device substantially coincide within the operational range, which renders the device suitable for direct drive by means of the three chrominance signals of, for example, a video signal, because the voltage compensation can be realised by means of a simple voltage difference.

A polymer layer having, for example a composition of approximately 60% of polymethyl methacrylate and 40% of polyvinylidene fluoride is preferably used for the extra layer of birefringent material.

The device thus obtained is very suitable for reflective display, as described in said patent application EP-A 294,899.

A further preferred embodiment is therefore characterized in that the second supporting plate is provided with a layer of reflecting material.

The device preferably comprises a polariser and an analyser, the angle between the direction of polarisation of the polariser and the direction of orientation of the molecules at the area of the first supporting plate being substantially 45°.

These and other aspects of the invention will now be described in greater detail with reference to some embodiments and the drawing.

DESCRIPTION OF THE PREFERRED EMBODIMENTS

Figures 1A, 1B, 1C:
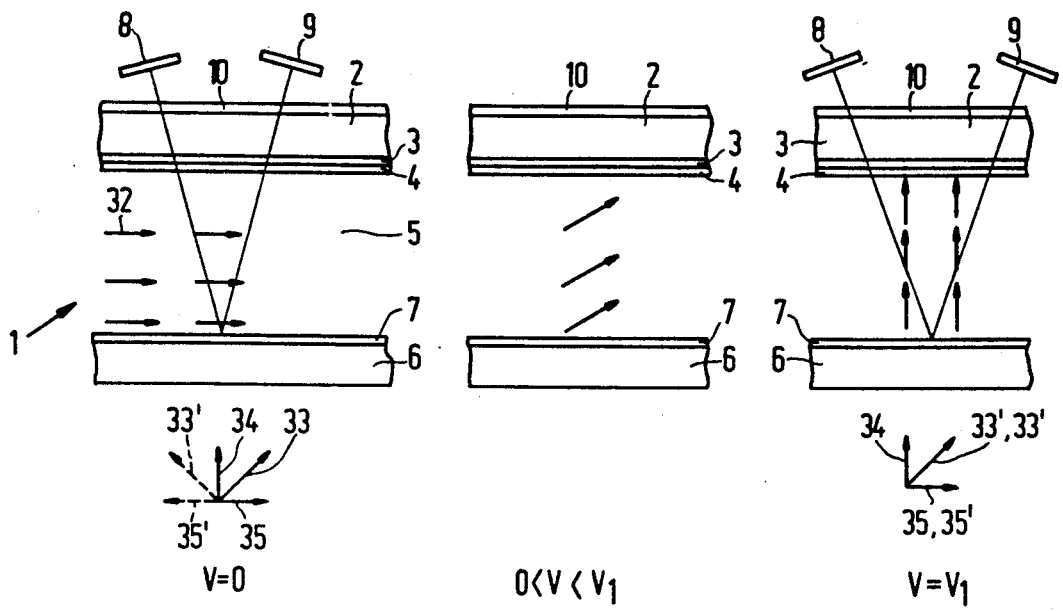
FIGS. 1a, 1b and 1c shows diagrammatically the operation of a device according to the invention, driven in reflection mode.

FIGS. 1a, 1b and 1c are diagrammatic cross-sections of a display device 1 provided with a first supporting plate 2 of, for example, glass. The supporting plate 2 is provided with a transparent electrode 3 of indium tin oxide or another suitable material and, if necessary, an orienting layer 4 which may also be used to prevent unwanted reactions between the liquid crystal material 5 and the electrodes. The liquid crystal material 5, for example ZLI 2452 (Merck) is present between the first supporting plate and a second supporting plate 6; the supporting plates are spaced apart by means of spacers which are not shown. The assembly is closed by means of a rim which is not shown either.

A matrix of pixels which may consist of reflecting picture electrodes 9 of, for example aluminum, is provided on the second supporting plate 6 which may not only be glass but also a semiconductor body. These picture electrodes can be electrically driven by means of switching elements realised in or on the second supporting plate 6.

In this example the thickness of the layer 5 may vary between 0.25 μm and, for example, 4 μm, dependent on the type of spacers used.

The use of said planar liquid crystal effect (ECB) with positive dielectric anisotropy will now be further described with reference to FIGS. 1a-1c. The surface layers 4 and 7 are prepared in such a manner that in the voltageless state the liquid crystalline molecules are directed in a given direction parallel to the surfaces of the supporting plates 2, 6.

Linearly polarised light having, for example, a direction of polarisation 33 (FIG. 1a) is passed by means of a polariser 8 whose direction of polarisation (vibration) extends at an angle of 45° to the orientation layer of the liquid crystal molecules (shown diagrammatically by means of the director 32). Since this direction of vibration extends at an angle of 45° to the direction of orientation of the liquid crystal, the incident polarised wave is split into an ordinary wave (with direction of vibration 34, parallel to the orientation direction of the liquid crystal) and an extraordinary wave (with direction of vibration 35 perpendicular to the direction of polarisation 34).

The difference in optical path length for the ordinary and extraordinary wave when leaving the liquid crystal is 2 dΔn after reflection (d = thickness of liquid crystal layer; Δn difference in refractive indices of the ordinary and the extraordinary wave). This optical path length difference is maximum in the situation of FIG. 1a because the liquid crystal molecules are oriented substantially parallel to the supporting plates ($\Delta n = \Delta n_{max}$). The entering and exiting abnormal beams are 180° out of phase (indicated by means of directions of vibration 35 and 35′, respectively) at such a choice of the thickness d that for a chosen wavelength $\lambda 0$ it holds that $2d\Delta n_{max} = \frac{1}{2}\lambda 0$). The direction of polarisation of the exiting light is then shifted 90° (indicated by 33′ in FIG. 1a) so that this light can pass an analyser 9 whose direction of polarisation is shifted 90° with respect to that of the polariser 31. At V=0 the maximum quantity of light is reflected.

In the situation of FIG. 1c the directors 32 of the liquid crystal are perpendicular to the two supporting plates. An incident polarised beam is not split up in this case and maintains its direction of polarisation (2dΔn=0). This beam is not passed by the analyser 9.

In the intermediate situation of FIG. 1b it holds that $0 < 2d\Delta < \frac{1}{2}\lambda 0$. The exiting beam is now elliptically or circularly polarised and is passed to a greater or lesser extent by the analyser 9, dependent on the applied voltage V and the associated angle between the directors and the supporting plates.

Figure 2:
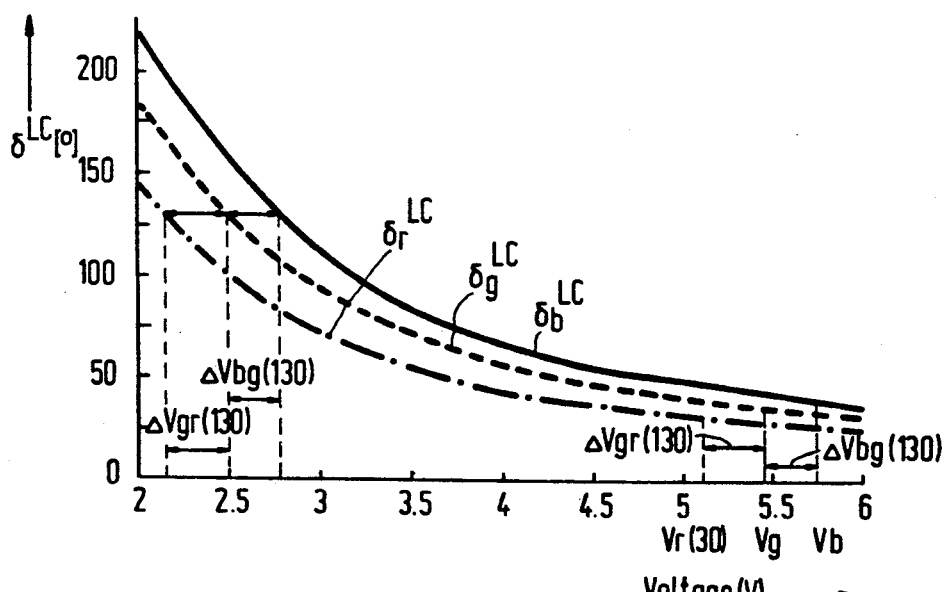
FIG. 2 shows the variation of the phase shift $\delta_{LC}$ of incident polarised light due to the birefringence in the liquid crystalline materials used in such devices for light beams having three different wavelengths.

For a full extinction in FIG. 1c, i.e. all directors are perpendicular to the supporting plates, a very high (theoretically infinite) voltage is required (curves a, b, c in FIG. 2).

In practice such a high voltage can be prevented by choosing an off voltage Vr (FIGS. 2, 3) at which a given quantity of light is still reflected corresponding to a phase shift $\delta_r^{LC}$ of the polarised light. Full extinction for one wavelength is obtained in this case by extending the device of FIG. 1 with, for example, a phase plate of, for example, polaroid, cellophane or another suitable birefringent material producing an opposite phase shift $-\delta r$.

FIG. 2 shows the variation of the phase shift in the liquid crystal material at three different wavelengths, namely in the red $\delta_r^{LC}$ at a wavelength of approximately 658 nm, in the green $\delta_g^{LC}$ at a wavelength of approximately 546 nm and in the blue $\delta_b^{LC}$ at a wavelength of approximately 480 nm. This Figure clearly shows that the three curves do not coincide so that a correction $-\delta_r$ at a voltage Vr which causes full extinction in the red still gives rise to a residual transmission in the two other wavelength ranges when using the same voltage. Since the curves (notably for $\delta^{LC} < 100°$) do not extend parallel either, a simple voltage compensation is not readily possible.

According to the invention the device is provided with a layer of birefringent material 10 having a wavelength-dependent phase shift, preferably with an optical axis which is perpendicular to the directors 32 in the voltageless state.

To determine the wavelength dependence, use is also made of the fact that the characteristic curves for the phase shift $\delta^{LC}$ (FIG. 2) extend substantially parallel for the three different colours at values of $\delta^{LC} < 100°$. In fact, if this were to hold for all values of $\delta^{LC}$, substantially identical characteristic curves can be obtained for the three colours by shifting the curves $\delta_g^{LC}$ and $\delta_b^{LC}$ by means of a voltage compensation circuit over a voltage range of, for example, $\Delta gr$ (130°) and $\Delta Vgb$ (130°), respectively, in other words by choosing $$Vg(0°) = Vr(0°) + \Delta Vgr(130°) \text{ and}$$

$$Vb(0°) = Vg(0°) + \Delta Vbg(130°).$$

It is clearly apparent from FIG. 2 that these shifts for Vg (0°) and Vb (0°) do not lead to $\delta^{LC} = 0°$, but that a further adaptation is necessary for the birefringence in the blue and the green of the extra layer 10. To this end the starting point is not $\delta_g^{LC} = \delta_b^{LC} = \delta_r^{LC} = 130°$, but a slightly different phase shift is taken as a starting point for the green and blue curves, while it is simultaneously assumed that there is a variation in the birefringence of the layer 14.

This leads to $$\delta_r^{LC} = 130° = 100° + \delta_r$$

$$\delta_g^{LC} = \delta_r^{LC} - \delta r + \delta g = 100° + \delta_g$$

$$\delta_b^{LC} = \delta_r^{LC} - \delta r + \delta b = 100° + \delta_b$$

On this basis, voltage adaptations $\Delta Vbg$ and $\Delta Vgr$ having a value of $$\Delta Vgr = Vg(100° + \delta g) - V_r(100° + \delta r)$$

$$\Delta Vbg = Vb(100° + \delta b) - V_g(100° + \delta r)$$

can be found. If the drive voltages of a device according to the invention are corrected with these values, the three curves for red, green and blue substantially coincide. In this case it holds that $\delta g/\delta r > \lambda g/\lambda r$ and $\delta b/\delta g > \lambda b/\lambda g$ in which $\lambda r$, $\lambda b$ and $\lambda g$ are the dominant wavelengths in the red, blue and green wavelength ranges, respectively.

Figure 3:
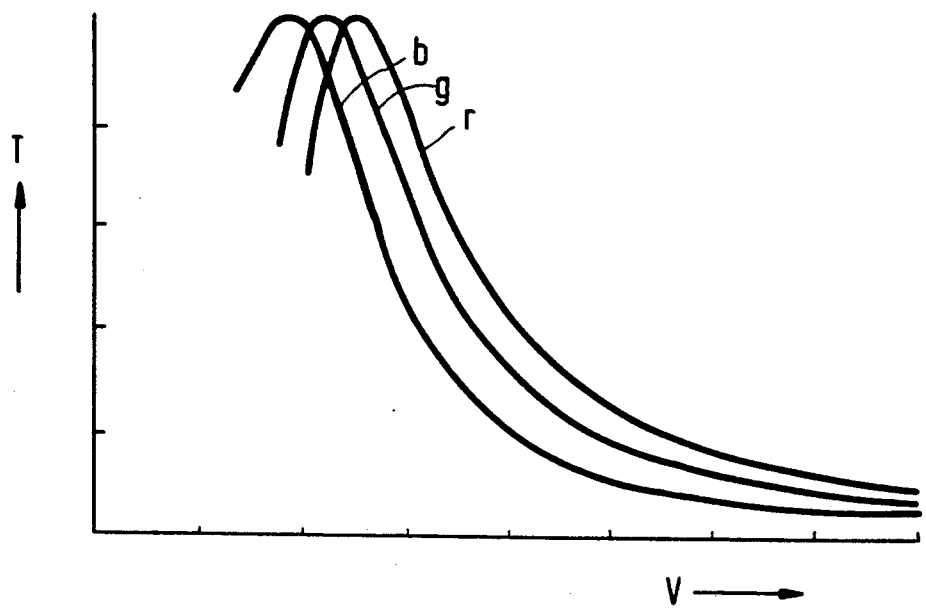
FIG. 3 shows transmission/voltage characteristic curves for a device without the extra layer of birefringent material.
Figure 4:
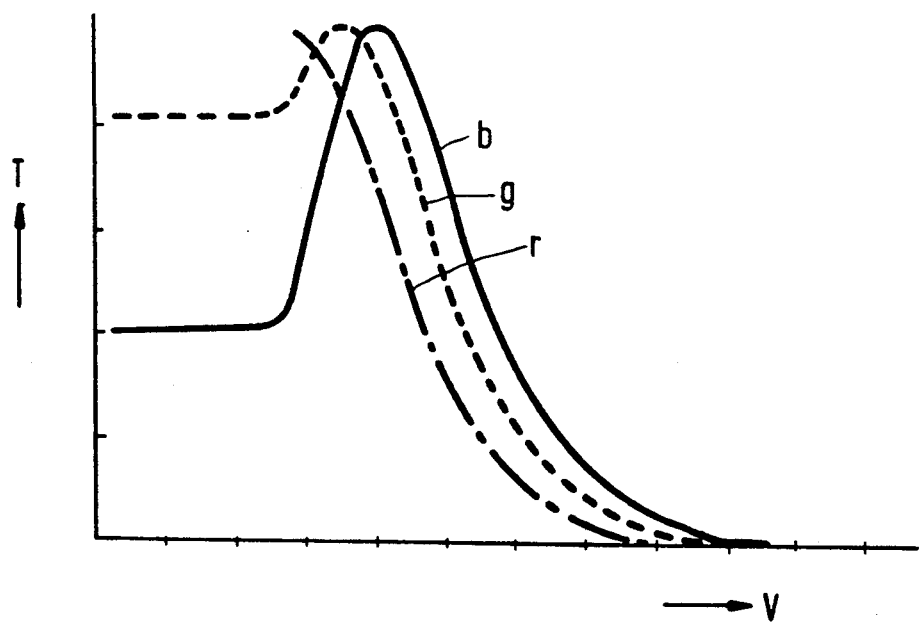
FIGS. 4, 5 show transmission/voltage characteristic curves for a device according to the invention.
Figure 5:
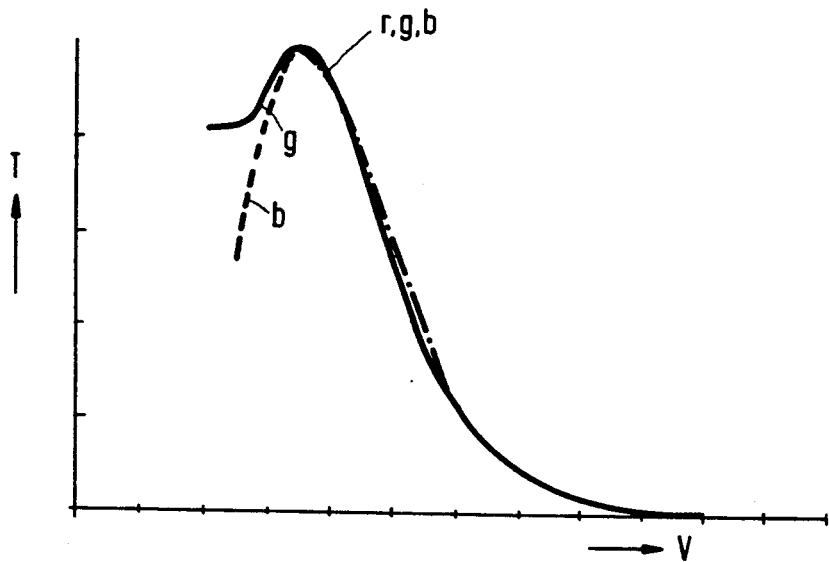

Together with FIGS. 4 and 5, FIG. 1a shows the effect of the invention. FIG. 3 shows the transmission/voltage characteristic curves for three wavelengths ($\lambda b = 480$ nm, blue; $\lambda g = 546$ nm, green; $\lambda r = 658$ nm, red) for a device without any extra birefringent layer 10. Notably in the low transmissive part the characteristic curves do not run parallel to each other. In the device of FIG. 4, where the extra layer is present, this is much less the case, and the characteristic curves substantially coincide after voltage compensation per colour (see FIG. 5).

The conditions with respect to the chosen phase shifts for the extra birefringent layer 10 associated with this example are found to be eminently satisfied by a layer comprising approximately 60% of polymethyl methacrylate and approximately 40% of polyvinylidene fluoride.

Dependent on the thickness of the layer the values of $\delta r$, $\delta g$ and $\delta b$ varied between values of 20°–40°, 25°–45° and 30°–50°, respectively.

Figure 6:
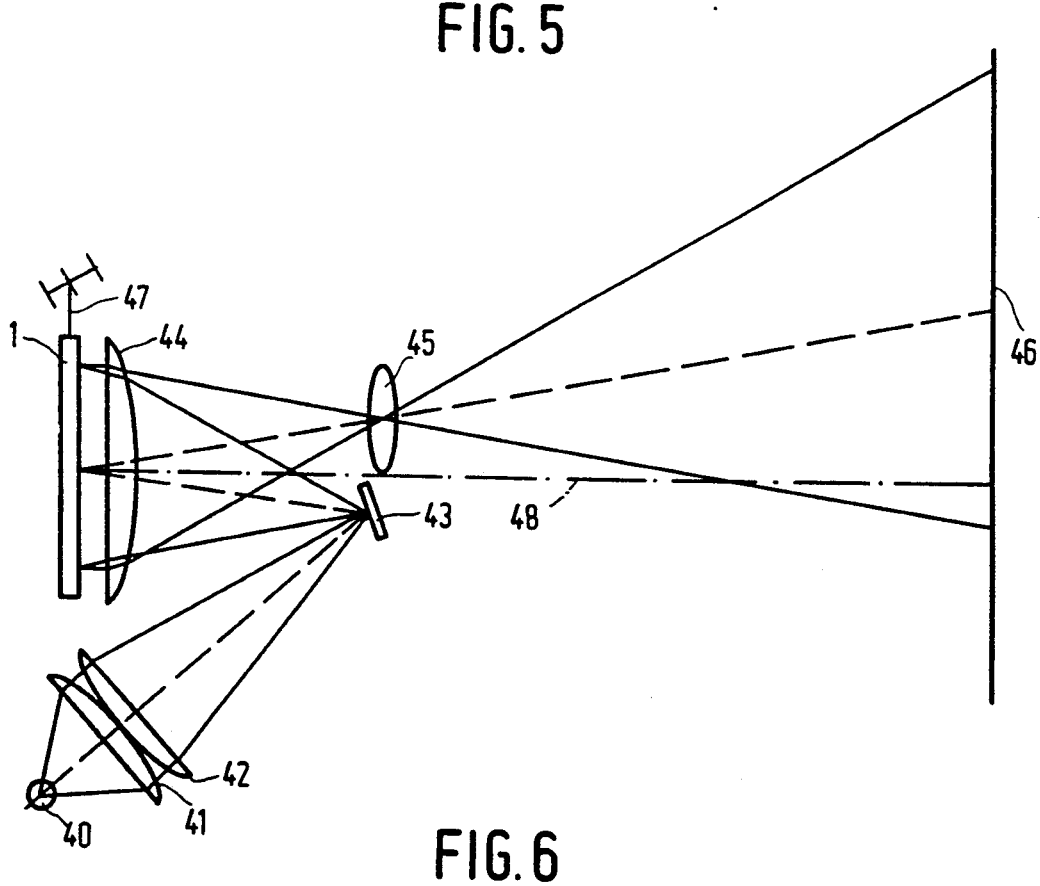
FIG. 6 shows a projection display device incorporating a device according to the invention.

FIG. 6 shows diagrammatically a projection device realised with a device 1 as described in FIG. 1.

A lamp 40 (shown diagrammatically) emits a light beam which, after having passed collimator lenses 41, 42, is incident on a mirror 43 and is thereby reflected through a small angle with respect to the normal 48 towards the liquid crystal device 1.

Via a planoconvex lens 44 the light reaches reflecting or non-reflecting electrodes of the semiconductor device which determine the state of the liquid crystal (light transmissive or non-transmissive) under the influence of drive electronics. The information determining this state may be, for example a TV signal which is shown diagrammatically by means of the antenna symbol 41.

After it has been reflected, the beam leaves the device 1 at a small angle with respect to the normal 48 and reaches the image plane 46 via the planoconvex lens 44 and a second lens 45. This plane may coincide, for example, with a projection screen. In this case, the polariser and analyser are arranged, for example, between the mirror 43 and the planoconvex lens 44 and between the lenses 44 and 45, respectively. The light beam may be a single beam of white light and, if necessary, the liquid crystal device 1 may be provided with a colour filter. The light beam may also be one of the 3 composite beams (for example red, green, blue) of a projection device operating with 3 beams. The liquid crystal device 1 is then driven by means of signals associated with the relevant colour.

The above described compensation method may of course also be used for two or more colour beams of other composite colours, dependent on its use.

We claim:

1. A display device provided with a layer of liquid crystalline material having a positive dielectric anisotropy between a first transparent supporting plate provided with at least a first transparent drive electrode and a second supporting plate provided with at least a second drive electrode, the layer of liquid crystalline material being switchable via electric voltages on the drive electrodes between a first state, in which the molecules of the liquid crystalline material have a first direction of orientation substantially parallel to the supporting plates or extend at a small angle to a plane parallel to the supporting plates, and a second state, in which the molecules of the liquid crystalline material have a second direction of orientation substantially perpendicular to the plane of the supporting plates, the device being further provided with an extra layer of birefringent material compensating a given quantity of birefringence in the layer of liquid crystalline material, the phase shift $\delta$ of incident polarised light due to birefringence in the extra layer of birefringent material decreasing as a function of the increasing wavelength, characterized in that $20° < \delta r < 40°$, $25° < \delta g < 40°$ and $30° < \delta b < 50°$.

2. A display device as claimed in claim 1, characterized in that it holds for the values $\delta r$, $\delta g$, $\delta b$ of the phase shift due to the birefringence of the extra layer at wavelengths in the red ($\lambda r$), green ($\lambda g$) and blue ($\lambda b$) that: $\delta g/\delta r > \lambda r/\lambda g$ and $\delta b/\delta g > \lambda g/\lambda b$.

3. A display device as claimed in claim 2, characterized in that it holds that: $\delta g/\delta r > 658/546$ and $\delta b/\delta g > 546/480$.

4. A display device as claimed in claim 3, characterized in that the transmission/voltage characteristic curves for red, green and blue or at least two other composite colours extend substantially parallel through at least a part of the voltage range.

5. A display device as claimed in claim 3, characterized in that the extra layer of birefringent material comprises polymethyl methacrylate and polyvinylidene fluoride.

6. A display device as claimed in claim 3, characterized in that the second supporting plate is provided with a layer of reflecting material.

7. A display device as claimed in claim 3, characterized in that the device comprises a polariser and an analyser, the angle between the direction of polarisation of the polariser and the direction of orientation of the molecules at the area of the first supporting plate being substantially 45°.

8. A display device as claimed in claim 3, characterized in that it comprises at least a light source whose light is incident on the liquid crystalline material and is reflected dependent on the optical state of the liquid crystalline material, and in that the light thus reflected is imaged via projection means.

9. A display device as claimed in claim 2, characterized in that the transmission/voltage characteristic curves for red, green and blue or at least two other composite colours extend substantially parallel through at least a part of the voltage range.

10. A display device as claimed in claim 2, characterized in that the extra layer of birefringent material comprises polymethyl methacrylate and polyvinylidene fluoride.

11. A display device as claimed in claim 2, characterized in that the second supporting plate is provided with a layer of reflecting material.

12. A display device as claimed in claim 2, characterized in that the device comprises a polariser and an analyser, the angle between the direction of polarisation of the polariser and the direction of orientation of the molecules at the area of the first supporting plate being substantially 45°.

13. A display device as claimed in claim 2, characterized in that it comprises at least a light source whose light is incident on the liquid crystalline material and is reflected dependent on the optical state of the liquid crystalline material, and in that the light thus reflected is imaged via projection means.

14. A display device as claimed in claim 1, characterized in that the transmission/voltage characteristic curves for red, green and blue or at least two other composite colours extend substantially parallel through at least a part of the voltage range.

15. A display device as claimed in claim 14, characterized in that the drive section is provided with a voltage compensation circuit for at least one colour.

16. A display device as claimed in claim 15, characterized in that the extra layer of birefringent material comprises polymethyl methacrylate and polyvinylidene fluoride.

17. A display device as claimed in claim 15, characterized in that the second supporting plate is provided with a layer of reflecting material.

18. A display device as claimed in claim 15, characterized in that the device comprises a polariser and an analyser, the angle between the direction of polarisation of the polariser and the direction of orientation of the molecules at the area of the first supporting plate being substantially 45°.

19. A display device as claimed in claim 15, characterized in that it comprises at least a light source whose light is incident on the liquid crystalline material and is reflected dependent on the optical state of the liquid crystalline material, and in that the light thus reflected is imaged via projection means.

20. A display device as claimed in claim 14, characterized in that the extra layer of birefringent material comprises polymethyl methacrylate and polyvinylidene fluoride.

21. A display device as claimed in claim 14, characterized in that the second supporting plate is provided with a layer of reflecting material.

22. A display device as claimed in claim 14, characterized in that the device comprises a polariser and an analyser, the angle between the direction of polarisation of the polariser and the direction of orientation of the molecules at the area of the first supporting plate being substantially 45°.

23. A display device as claimed in claim 14, characterized in that it comprises at least a light source whose light is incident on the liquid crystalline material and is reflected dependent on the optical state of the liquid crystalline material, and in that the light thus reflected is imaged via projection means.

24. A display device as claimed in claim 1, characterized in that the extra layer of birefringent material comprises polymethyl methacrylate and polyvinylidene fluoride.

25. A display device as claimed in claim 24, characterized in that the second supporting plate is provided with a layer of reflecting material.

26. A display device as claimed in claim 24, characterized in that the device comprises a polariser and an analyser, the angle between the direction of polarisation of the polariser and the direction of orientation of the molecules at the area of the first supporting plate being substantially 45°.

27. A display device as claimed in claim 24, characterized in that it comprises at least a light source whose light is incident on the liquid crystalline material and is reflected dependent on the optical state of the liquid crystalline material, and in that the light thus reflected is imaged via projection means.

28. A display device as claimed in claim 1, characterized in that the second supporting plate is provided with a layer of reflecting material.

29. A display device as claimed in claim 28, characterized in that the device comprises a polariser and an analyser, the angle between the direction of polarisation of the polariser and the direction of orientation of the molecules at the area of the first supporting plate being substantially 45°.

30. A display device as claimed in claim 28, characterized in that it comprises at least a light source whose light is incident on the liquid crystalline material and is reflected dependent on the optical state of the liquid crystalline material, and in that the light thus reflected is imaged via projection means.

31. A display device as claimed in claim 1, characterized in that the device comprises a polariser and an analyser, the angle between the direction of polarisation of the polariser and the direction of orientation of the molecules at the area of the first supporting plate being substantially 45°.

32. A display device as claimed in claim 31, characterized in that it comprises at least a light source whose light is incident on the liquid crystalline material and is reflected dependent on the optical state of the liquid crystalline material, and in that the light thus reflected is imaged via projection means.

33. A display device as claimed in claim 1, characterized in that it comprises at least a light source whose light is incident on the liquid crystalline material and is reflected dependent on the optical state of the liquid crystalline material, and in that the light thus reflected is imaged via projection means.

* * * * *